Figure 1:
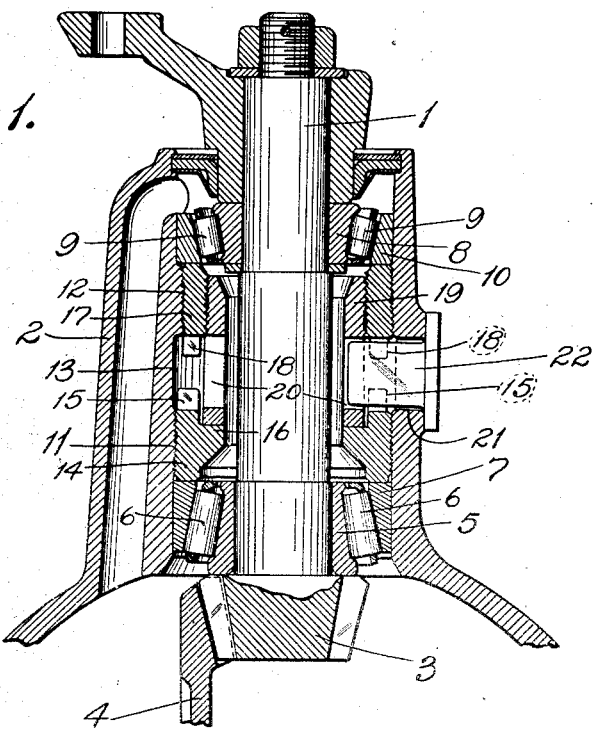

Sept. 11, 1928.   W. J. CHIEVITZ   1,683,594

SHAFT BEARING

Filed Oct. 27, 1927

INVENTOR:
Wm. J. Chievitz,
by Carr & Carr & Gravely
HIS ATTORNEYS.

Patented Sept. 11, 1928.

1,683,594

UNITED STATES PATENT OFFICE.

WILLIAM J. CHIEVITZ, OF CANTON, OHIO, ASSIGNOR TO THE TIMKEN ROLLER BEARING COMPANY, OF CANTON, OHIO, A CORPORATION OF OHIO.

SHAFT BEARING.

Application filed October 27, 1927. Serial No. 228,150.

This invention relates to the mounting of shafts and has for one of its principal objects to enable the shaft to be adjusted endwise by bodily movement thereof. Another principal object is to provide for the use of two or more series of antifriction bearings in such manner that the raceway members thereof may be adjusted relative to each other without disturbing the endwise adjustment of the shaft. Another principal object is to enable the shaft to be adjusted bodily endwise without disturbing the adjustment of the bearings and, vice versa to enable the bearings to be adjusted without disturbing the endwise adjustment of the shaft. Another object is to provide for the locking of the parts in adjusted position.

The invention consists in the shaft bearing and in the parts and combinations and arrangements of parts hereinafter described and claimed. In the accompanying drawing, wherein like reference characters indicate like parts wherever they occur.

Figure 2:
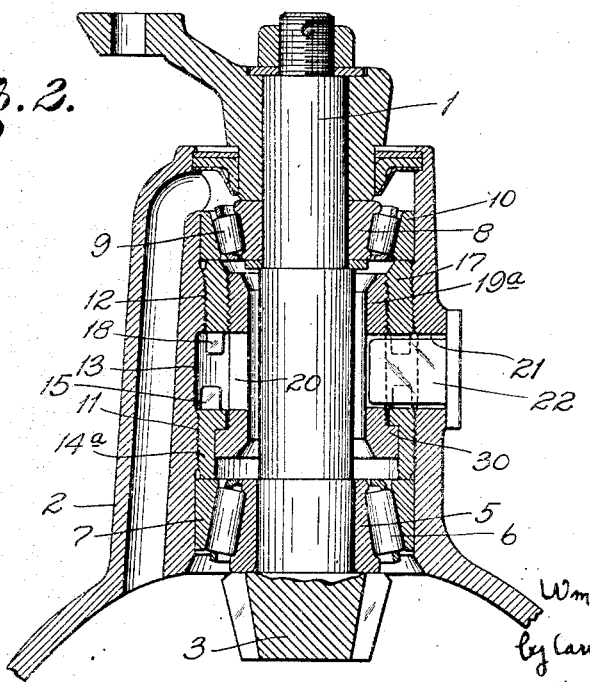

Fig. 1 is a longitudinal sectional view of a shaft bearing embodying my invention; and Fig. 2 is a similar view illustrating a modified form of the invention.

Fig. 1 illustrates the propeller shaft 1 of a motor vehicle mounted in a housing 2 which is part of an axle housing or differential carrier of well known type. At one end of the shaft is a bevel pinion 3 which is fixed thereon or integral therewith and arranged to mesh with the bevel ring gear 4 of suitable differential mechanism (not shown in the drawings). Mounted on the shaft 1 with its large end abutting against the back of the pinion 3 is a cone 5 or inner bearing member of an antifriction bearing. Surrounding this cone 5 is a series of taper rollers 6 that run in a conical cup 7 or outer bearing member which has a sliding fit in the inner cylindrical end of the housing. The outer end portion of the shaft 1 is provided with a cone 8 or inner bearing member whose large end abuts against a suitable abutment member secured to said shaft. Surrounding this cone 8 is a series of taper rollers 9 that cooperate with a cup 10 or outer bearing member that has a sliding fit in the outer cylindrical end portion of the housing 2.

The interior cylindrical wall of said housing has screw threads 11 therein adjacent to the bearing cup 7 at the inner end thereof and similar screw threads 12 of the same pitch adjacent to the bearing cup 10 of the bearing at the outer end thereof, said screw threads 11—12 being spaced apart by an annular channel or groove 13 in the middle portion of the housing. On the threads 11 adjacent to the bearing cup 7 of the inner bearing works a threaded ring 14 that is provided with spaced lugs 15 that extend into the space between said rings opposite said annular groove or channel. Said ring 14 is provided with an annular rib 16 or flange. Said ring 14 abuts against the bearing cup 7 and turning of said ring independently of the other parts of the construction adjusts said bearing cup.

An exteriorly threaded ring 17 works on said threads 12 at the outer end of the housing and abuts against the bearing cup 10. Rotation of said ring 17 independently of the other parts of the mechanism adjusts said bearing cup 10. Said ring 17 is provided with spaced lugs 18 that extend into the space between the two rings opposite the channel or groove 13.

Said ring 17 is interiorly threaded and mounted therein is the exteriorly threaded end of a sleeve 19 that abuts against the rib 16 on said threaded ring 14. Said sleeve 19 is provided with slots 20 adapted to receive a tool by means of which the sleeve may be turned.

The housing 2 is provided with an opening 21 opposite the channel 13 or recess through which may be inserted a tool for separately rotating said sleeve 19 and said threaded rings 14—17 or for turning any two of them or all three of them together.

If the sleeve 20 and the two threaded rings 14—17 are turned as a unit the whole shaft 1 may be moved endwise to adjust the mesh of the pinion 3 with the ring gear 4. If the threaded ring 14 is turned separately, the bearing cup 7 of the inner bearing is adjusted; and if the threaded ring 17 is turned separately the bearing cup 10 of the outer bearing is adjusted. After the pinion 3 is properly meshed with its gear 4 and the two bearing cups 7—10 properly adjusted, the sleeve 19 is turned separately in the outer threaded ring 17 to bear against the rib 16 of the inner threaded ring 14. This movement tends to spread the two rings 14—17 apart, preventing them from turning and losing the proper adjustment of the bearings. The parts may be further locked in position by means of a locking member 22 extending between lugs of the two rings 14—17 and into a slot of the sleeve.

In the slight modification shown in Fig. 2, the threaded ring 14ᵃ at the inner end of the housing has a rib at its end that is overlapped by an annular rib 30 on the sleeve 19ᵃ. In locking the parts the sleeve 19ᵃ is turned so as to tend to pull the two threaded rings 14ᵃ—17 together.

The above described construction easily accommodates the relative movement of the several parts that is required to adjust the two bearings and to lock them in position. At the same time it permits the unitary movement of all the parts that is required to adjust the mesh of the pinion with its gear. At the same time the locking of the adjusting members is effected without any circumferential stress on the bearing members that would tend to impair the true circularity thereof. Obviously balls or cylindrical rollers might be substituted for the taper rollers and other changes might be made without departing from the invention; accordingly I do not wish to be limited to the details of construction shown and described.

What I claim is:

1. The combination with a shaft, a housing therefor having two portions of its interior wall screwthreaded and roller bearings interposed between said shaft and said housing, of an adjusting device comprising exteriorly threaded rings engaging said screwthreaded portions of said housing respectively and abutting against the outer bearing members of said roller bearings, one of said rings being interiorly threaded and a sleeve having an exteriorly threaded portion threaded into said interiorly threaded ring and having a portion engaging the other ring.

2. The combination with a shaft, a housing therefor having two portions of its interior wall screwthreaded and roller bearings interposed between said shaft and said housing, of an adjusting device comprising exteriorly threaded rings engaging said screwthreaded portions of said housing respectively and abutting against the outer bearing members of said roller bearings, one of said rings being interiorly threaded and the other having an annular rib and a sleeve having an exteriorly threaded portion threaded into said interiorly threaded ring and having an annular rib overlapping said rib of the other ring.

3. The combination with a shaft, a housing therefor having two portions of its interior wall screwthreaded and roller bearings interposed between said shaft and said housing, of an adjusting device comprising exteriorly threaded rings engaging said screwthreaded portions of said housing respectively and abutting against the outer bearing members of said roller bearings, one of said rings being interiorly threaded and the other having an annular rib and a sleeve having an exteriorly threaded portion threaded into said interiorly threaded ring and having a portion engaging said rib of the other ring.

4. The combination with a shaft, a housing therefor having two portions of its interior wall screwthreaded and roller bearings interposed between said shaft and said housing, of an adjusting device comprising exteriorly threaded rings engaging said screwthreaded portions of said housing respectively and abutting against the outer bearing members of said roller bearings, one of said rings being interiorly threaded and the other having an annular rib and a sleeve having an exteriorly threaded portion threaded into said interiorly threaded ring and having a portion engaging said rib of the other ring, the adjacent ends of said rings being provided with series of lugs adapted to be engaged by a tool and said sleeve being provided with slots adapted to be engaged by a tool, whereby said rings and said sleeve may be rotated separately or together with one or both of the others.

Signed at Canton, Ohio, this 20th day of October, 1927.

WILLIAM J. CHIEVITZ.